United States Patent [19]

Dailey et al.

[11] Patent Number: 5,528,827

[45] Date of Patent: Jun. 25, 1996

[54] METHOD AND DEVICE FOR INSTALLING A HEADER CAP ON A WATER HEADER OF A STATOR COIL

[75] Inventors: George F. Dailey, Pittsburgh; Michael T. O'Leary, Apollo, all of Pa.

[73] Assignee: Westinghouse Electric Corporation, Pittsburgh, Pa.

[21] Appl. No.: 431,598

[22] Filed: Apr. 27, 1995

Related U.S. Application Data

[62] Division of Ser. No. 239,491, May 9, 1994, Pat. No. 5,423,473.

[51] Int. Cl.⁶ ..................................... B23P 15/26
[52] U.S. Cl. .................. 29/890.052; 29/732; 29/890.03
[58] Field of Search .............. 29/890.052, 732, 29/890.03; 228/44.3, 212

[56] References Cited

U.S. PATENT DOCUMENTS

| | | | |
|---|---|---|---|
| 3,603,498 | 9/1971 | Cook | 228/4 |
| 4,155,157 | 5/1979 | Gusbacher | 29/726 |
| 4,909,429 | 3/1990 | Ankrom et al. | 228/57 |
| 5,020,714 | 6/1991 | Miles et al. | 228/15.1 |

*Primary Examiner*—Irene Cuda

[57] ABSTRACT

A method for installing a header cap on a water header both positioned on a stator coil. The method includes the steps of creating a generally smooth surface on the water header for providing a mating surface on the water header. A seal is interposed between the mating surface of the water header and the header cap for providing a material used to provide a sealed boundary between the cap and mating surface. The header cap and the mating surface of the water header are placed in abutting relationship with the seal for forming a layered, contiguous connection. A pressure device is attached in operative association with the header cap for operatively applying a pressure to the header cap. A spring which is received by the pressure device is compressed for applying a constant and unidirectional pressure to the pressure device which, in turn, transmits the constant and unidirectional pressure to the header cap. The connection is finally heated for brazing the header cap and water header together and for forming a seal.

4 Claims, 3 Drawing Sheets

5,528,827

METHOD AND DEVICE FOR INSTALLING A HEADER CAP ON A WATER HEADER OF A STATOR COIL

This is a division of application Ser. No. 08/239,491 filed May 9, 1994, now U.S. Pat. No. 5,423,473.

FIELD OF THE INVENTION

The present invention relates generally to a method and device for installing a header cap on a water header of a stator coil and, more particularly, to such a device and method for providing an improved seal between the header cap and water header.

BACKGROUND OF THE RELATED ART

As is well known in the art, a generator includes a housing enclosing a generally cylindrical shaped stator having an annular transverse cross section defining a longitudinally extending bore through its center. A plurality of electrical grade steel lamination are arranged to form a plurality of stator teeth extending circumferentially around the stator. The plurality of teeth are arranged to define a plurality of channels, generally referred to in the art as stator slots, which extend longitudinally over the length of the stator between adjacent teeth and are arranged to receive three electrical conductors or windings, collectively referred to as the stator windings, which are arranged in a predetermined configuration as is well known in the art. The stator winding configuration in the stator slots will be described later in detail. Each stator winding functions to provide a conductor wherein electricity is generated for distribution to the end user. A plurality of cooling passageways, typically having water flowing therethrough, extend through the stator winding for cooling it during operation. A plurality of support devices are attached to and positioned upwardly over the windings for providing structural support for the windings.

As an example of a typical portion of such a stator winding arrangement, a first stator slot typically receives two of the three windings which are positioned atop each other for forming a top and bottom winding, and these two windings extend out of the stator slot and wrap around and bend into another predetermined second stator slot in reversed positions so that the top winding in the first stator slot is the bottom winding in the second stator slot and vice versa for the other winding.

A rotor winding is wound around a rotatable, circular shaped rotor which is matingly placed in the stator bore. When in operation, the rotor rotates for inducing a voltage on the stator windings which, in turn, generates the electricity on the stator windings, as is well known in the art.

As previously stated, at each end of stator slot, each winding extends out of a stator slot, bends around the stator slot and projects into another predetermined stator slot for allowing the winding to be wound into its predetermined configuration. Due to the rigid, inflexible construction of the stator winding, the winding can't easily bend out of or into the stator slot. To provide this necessary flexibility, each stator winding is spliced adjacent the stator slot end and the exposed ends formed from this splicing are fitted with a water header which, in turn, is affixed to a header cap. The water header functions as a cable termination, and the header cap functions as a connection mechanism. A water tight seal, typically Silphos which is well known in the art, is interposed between the header cap and water header for forming a continuous, layered connection which is brazed together for forming a braze joint. The header caps are then attached to its corresponding header cap by a plurality of copper strands for forming a mated pair of header caps in contiguous series connection for re-attaching the stator winding. However, the header cap and braze joint may eventually need replacing because of the mechanical vibration, corrosion and the like of the generator.

Typically, to replace a header cap, one header cap of the mated pair is heated by an induction tool at its connection to the water header and is then pulled away from its respective water header for detaching it. The copper strands are then removed from this detached header cap for completely detaching it from the stator winding circuit.

To complete the installation, a new header cap and water tight seal are attached to the exposed water header by brazing them together and by re-connecting the header cap to the copper strands, all of which is described above. In performing this installation, a variety of tools may be used to hold the header cap to the exposed stator end. One such tool is a generally T-shaped clamping tool having an upright post with a transverse piece near its top portion. The transverse piece is adjustable perpendicularly relative to the upright post so that if adjusted to its extreme it forms a generally L shape. A clamp is attached to one end of the transverse piece in which an adjustable pin extends generally parallel to and downwardly from the transverse piece. The pin is also perpendicularly adjustable relative to the upright post. To use this tool, the tool attaches to a portion of the winding support devices at a bottom portion of the upright post for structural support. The transverse piece is adjusted so that the pin is positioned adjacent the header cap, and the pin is then adjusted so that it is in abutting contact with the header cap for holding the header cap in place during the brazing process.

Although the presently known and utilized device and method for holding the header cap to the water header during brazing are satisfactory, they are not without drawbacks. Because of the intense heat used during brazing, the force and direction applied to hold the header cap to the stator exposed end varies. This causes problems such as the thickness of the brazed connection increasing beyond specification, which results in a mechanical weak joint.

Consequently, a need exists for an improved method and device for installing a header cap on a water header of a stator coil.

SUMMARY OF THE INVENTION

The present invention provides an improvement designed to satisfy the aforementioned needs. Particularly, the present invention is directed to a method for installing a header cap on a water header both positioned on a stator coil, comprising the steps of (a) creating a generally smooth surface on the water header for providing a mating surface on the water header; (b) interposing a sealing means between the header cap and the mating surface of the water header for providing a material used to provide a sealed boundary between the cap and mating surface; (c) placing the header cap and the mating surface of the water header both in abutting relationship with the sealing means for forming a layered, contiguous connection; (d) attaching a pressure device in operative association with the header cap for operatively applying a pressure to the header cap; (e) compressing a spring received by the pressure device for applying a constant and unidirectional pressure to the pressure device which, in turn, transmits the constant and unidirectional pressure to the header cap; and (f) heating the connection for brazing the header cap and water header together and for forming a seal.

In another broad form, the invention resides in a system for forming a seal between a header cap and a water header both positioned on a stator coil comprising (a) a compressed spring operatively associated with the header cap for generating a generally constant and unidirectional pressure; (b) pressure means in abutting contact with the header cap generally at a point directly over the centroid of the water header and cooperatively receiving said spring for transmitting the constant and unidirectional pressure of said spring to the header cap; and (c) brazing means for brazing the header cap to the water header.

It is an object of the present invention to provide a method and device for applying a constant direction and force to hold the header cap to the stator coil during brazing.

These and other objects will become apparent to those skilled in the art upon a reading of the following detailed description when taken in conjunction with the drawings wherein there is shown and described illustrative embodiments of the invention.

BRIEF DESCRIPTION OF THE DRAWINGS

While this specification concludes with claims particularly pointing out and distinctly claiming the subject matter of the invention, it is believed the invention will be better understood from the following description, taken in conjunction with the accompanying drawings wherein:

DESCRIPTION OF THE PREFERRED EMBODIMENT

Figure 1:
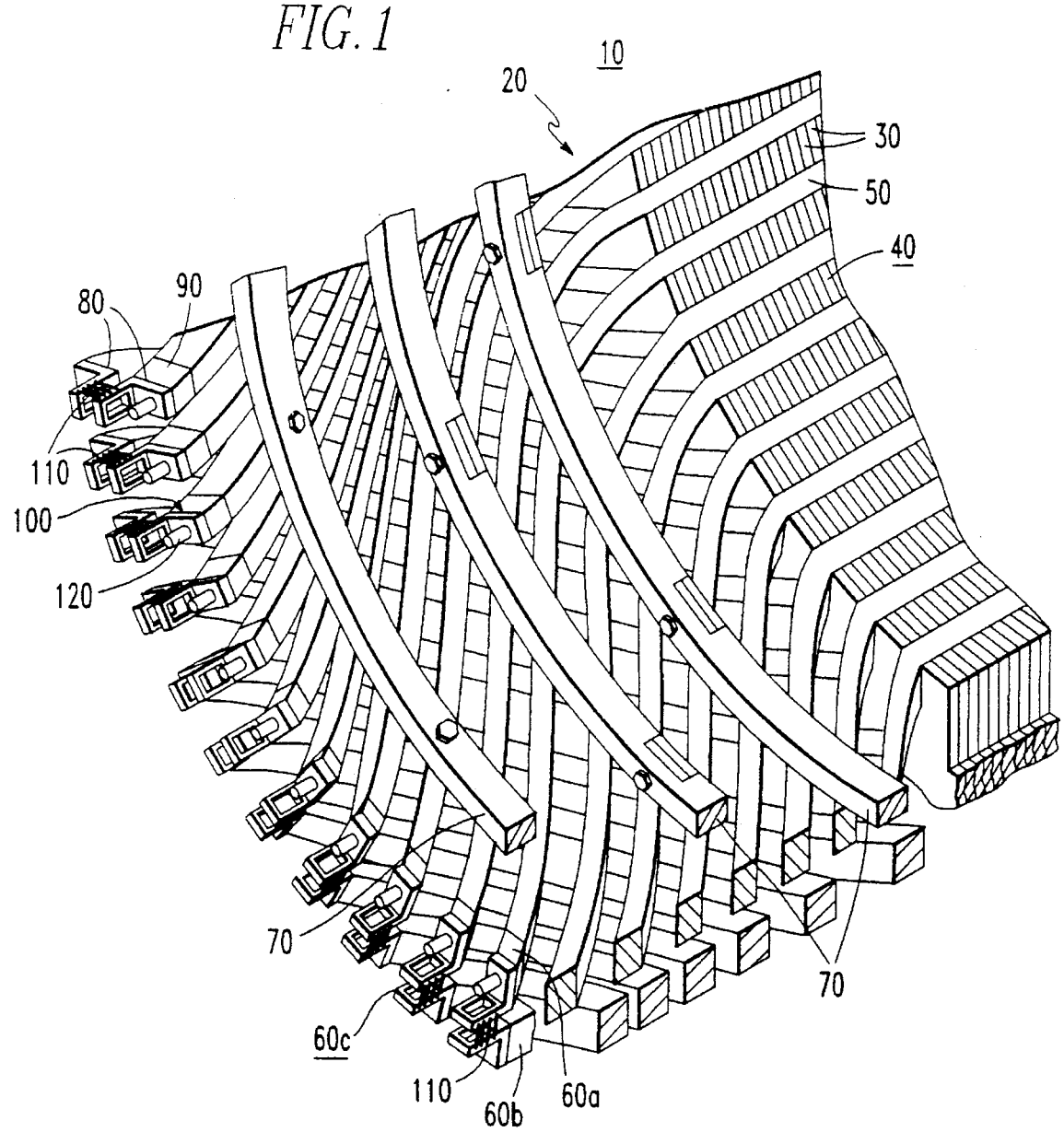
FIG. 1 illustrates a perspective view of a portion of a stator.

In the following description, like reference characters designate like or corresponding parts throughout the several views of the drawing. Also in the following description, it is to be understood that such terms as "forward," "rearward," "left," "right," "upwardly," "downwardly," and the like are not to be construed as limiting terms.

Now referring to the drawings, and particularly to FIG. 1, there is illustrated a portion of a stator of a large dynamoelectric machine, generally designated by the numeral 10. As is well known in the art, the stator 10 has a generally cylindrical configuration and a generally annular transverse cross section defining a longitudinal bore through its center. The stator 10 also includes two end portions 20 (only one end is shown). When the stator 10 is operated, the stator 10 is positioned in an enclosed electrical housing (not shown) and extends substantially the length of the generator. The stator 10 is formed from a plurality of laminations 30, each of the laminations 30 are configured so that upon assembly the plurality of laminations define a plurality of protruding stator teeth 40. An individual channel, herein referred to as a stator slot 50, is disposed between adjacent teeth 40. Three stator windings 60a, 60b, and 60c, wherein a voltage is induced during operation, are disposed in a predetermined, two layer arrangement (i.e., only two of the three windings are in each slot) within each stator slot 50 for forming a top and bottom winding as is well known in the art. At each stator end 20, the windings 60 extend out of the stator slot 50 and are arranged in a spaced apart, swerving configuration. A plurality of support devices 70 are attached to the winding 60 in a predetermined configuration for providing support to the winding 60.

Two header caps 80 are placed in a close proximity, spaced apart relationship with each other respectively on each winding 60 adjacent the stator slot end 20 for allowing an efficient means for the winding 60 to bend around the stator end 20. A water header 90 and an elastic seal (not shown) are typically attached on the stator winding 60 for respectively forming a cable termination and a seal for the termination. The connection of the header cap 80, seal and water header 90 is brazed together for forming a brazed joint 100. Each header cap 80 on the top winding is mated to a header cap 80 on the bottom winding by electrical conducting strands 110 for forming a mated pair of header caps 80 which, in turn, completes the continuous electrical circuit of the winding 60. A nozzle 120 protrudes through each cap 80 for allowing cooling water circulating through the winding 60 to either exit or enter the interior of the winding 60 which, in turn, cools the winding 60.

Figure 2:
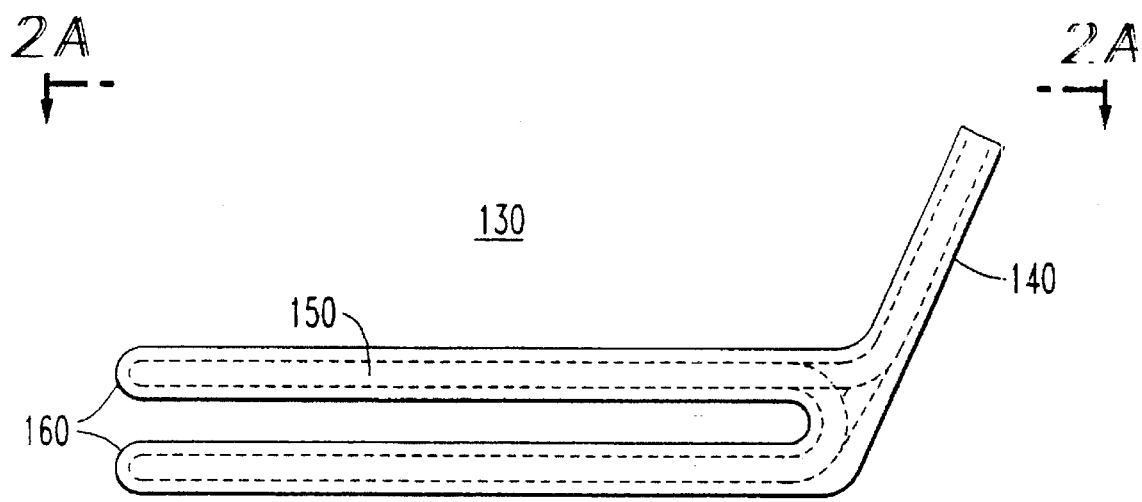
FIG. 2 illustrates a view in side elevation of an induction heating tool.
Figure 2A:
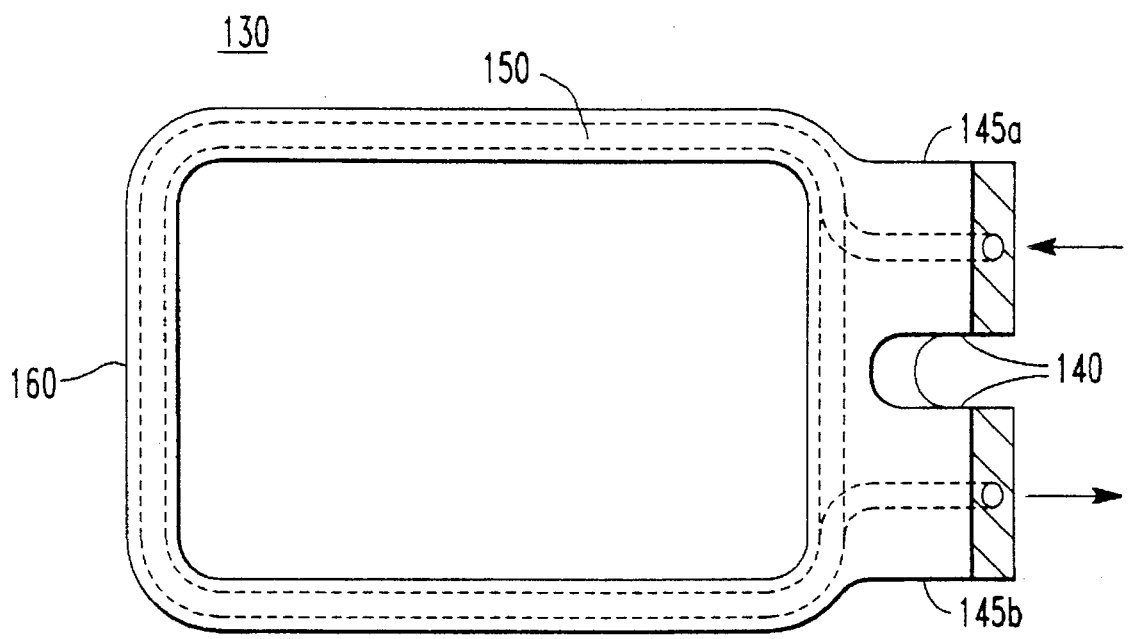
FIG. 2A illustrates a view taken along line 2A—2A of FIG. 2.

Referring to FIGS. 2 and 2A, an induction tool 130 is shown for melting the brazed joint connection 100 of the header cap 80 to the water header 90 which allows the header cap 80 to be attached and detached from the water header 90 and, in turn, the winding 60. A power supply (not shown), such as a pillar solid state inverter, catalog number 10-760, which is available from Mannings U.S.A. located in Morristown, N.J., is electrically connected to the induction tool 130 for supplying a current and voltage to the induction tool 130. Typically, a voltage of 480 volts is supplied to the tool 130 with a maximum current of 175 amps. The induction tool 130 includes an elongated handle 140 having into two portions 145a and 145b. The handle 140 branches out at its bottom portion where it attaches to two generally rectangular shaped heating surfaces 160 which are in a spaced apart, tiered relationship with each other. The handle 140, portions 145a and 145b, and heating surfaces 160 each contain a continuous, hollowed-out portion 150 for containing an insulated electrical conductor (not shown) for passing an electrical current therethrough. When in operation, the heating surfaces 160 are placed adjacently over the connection 100 of the winding 60 to the header cap 80 for melting this connection 100, as will be described in detail below. Cooling water enters and exits the hollowed-out portion 150 as indicated by the arrows for cooling the heating surfaces 160 during the heating process.

Figure 3:
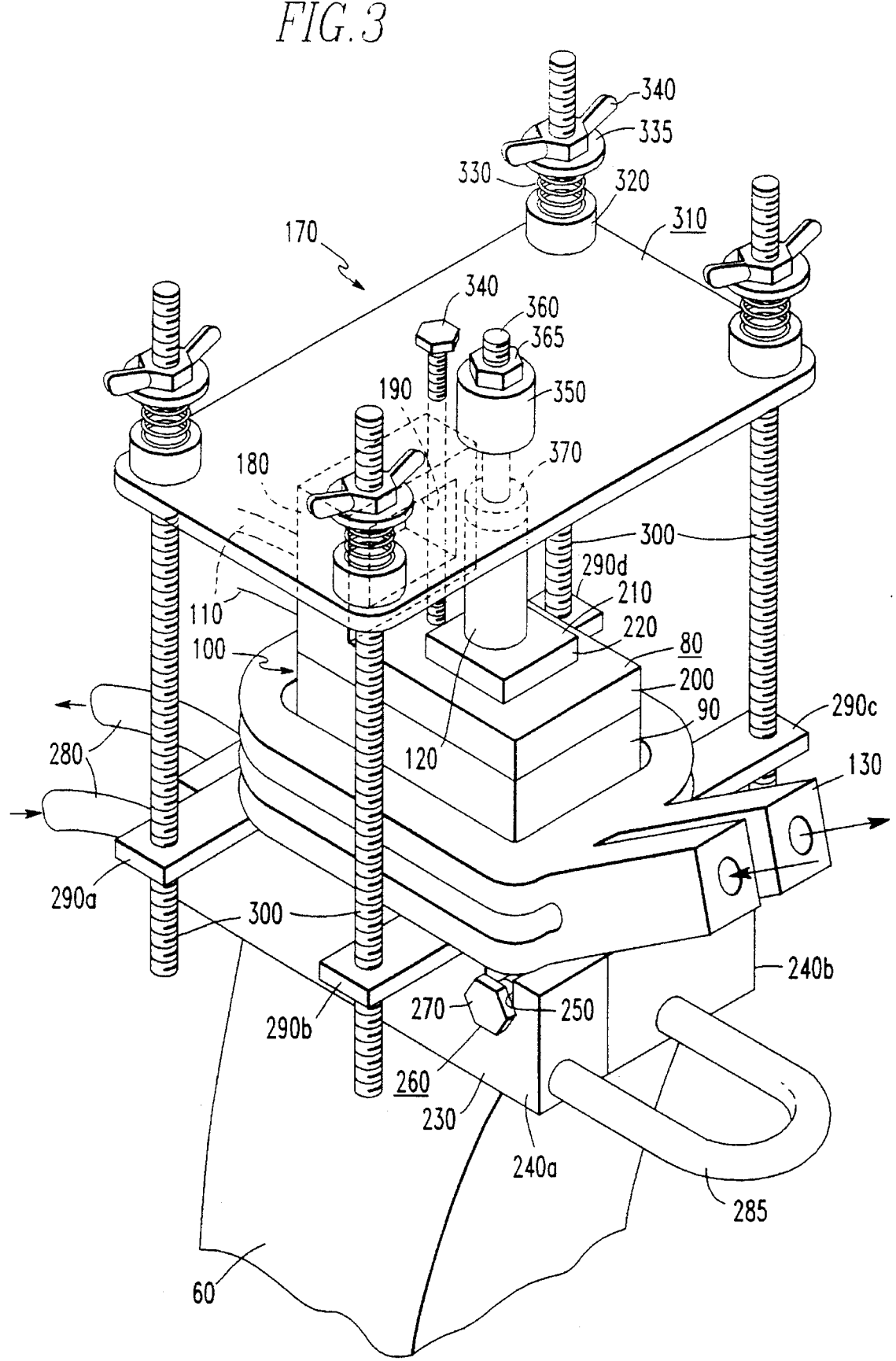
FIG. 3 illustrates a perspective view of the induction tool and a holding device of the present invention which are used in conjunction with each other for holding the header cap and winding in stationary positional relationship with each other during a brazing process.

Referring to FIG. 3, a header cap 80 is illustrated with a holding device 170 of the present invention positioned surrounding the header cap 80 for applying and maintaining a constant pressure and directional force on the header cap 80 during the brazing process, which will be described later in detail. It will be obvious to those skilled in the art that the induction tool 130 is matingly disposed surrounding the brazed connection 100 before installing the holding device 170. The header cap 80, which is generally L-shaped, includes a generally rectangular shaped piece 180 defining a hollowed out portion 190 and further includes a solid portion 200 forming a foundation. Although not clearly shown in FIG. 3, the strands 110 are connected to the rectangular shaped piece 180 of its mated header cap 80 for completing the electrical circuit of the winding 60. The solid portion 200 abuts the generally rectangular shaped water header 90 and is brazed onto the water header 90 for forming an electrical connection. A platform portion 210, which is an integral part of the solid piece 200, projects slightly outwardly from the solid piece 200 and includes a beveled edge 220 extending downwardly for attaching to the solid piece 200. The tapered nozzle 120 extends outwardly from the platform portion 210 for allowing the cooling water (not shown) to circulate through the winding 60.

The holding device 170 includes a cooling assemblage 230 surroundingly enclosing the end of the winding 60 for cooling the winding 60 during the below described brazing process. The cooling assemblage 230 includes two L-shaped members, a first and second member 240a and 240b, each having a notched out portion 250 (only one notch is shown) for each receiving a screw 260 (only one screw is shown) which respectively forms two attachments for structurally holding the members 240a and 240b together. By way of illustrating only one of the two attachments, the members 240a and 240b are attached together by placing the screw 260 in the hollowed out portion 250 of the first member 240a and forcing the shaft of the screw 260 into the second member 240b so that the bolt head 270 abuts the first member 240a. An outlet (not shown) extends outwardly from each member 240a and 240b for each receiving a hose 280 which allows water to flow through a passageway (not shown) in both members 240a and 240b as indicated by the arrows. A generally U-shaped hose 285 connects the cooling passageways which are disposed through each member 240a and 240b. This cooling prevents damage to the winding 60 during the brazing process. Four rectangular shaped pieces 290a, 290b, 290c, and 290d each extend from and are attached to the cooling assemblage 230. A threaded hole (not shown) is disposed through an end portion of each piece 290 for receiving an elongated, stainless steel, non-magnetic threaded element 300.

A rectangular shaped plate 310 rests outwardly adjacent the header cap 80 and includes a threaded hole (not shown) through each corner for each receiving the threaded element 300. A washer 320 is disposed on each threaded element 300 abutting the plate 310. A spring 330 is also positioned on the element 300 and abuts the washer 320 for creating a tension on the plate 310 when compressed. A second washer 335 rests abutting the opposite end of the spring 330. A tightener 340 is placed on each threaded element 300 abutting the second washer 335 for compressing the spring 330 via the washer 335 which, in turn, adjusts the tension the spring 330 applies to the plate 310.

A threaded operator 340 extends generally through the center of the plate 310 and abuts the solid piece 200 for holding the header cap 80 in its stationary positional relationship with the winding 60. A threaded hole (not shown) extends through the plate 310 for receiving the operator 340 which is turned by a suitable tool for adjusting the pressure applied to the header cap 80. A circular shaped lip portion 350 having a threaded bore (not shown) through its center extends outwardly from the plate 310 for receiving a threaded stud 360 in the bore. The stud 360 includes an enlarged end portion 370 which contacts the nozzle 120 for applying pressure to the nozzle 120 and, in turn, the header cap 80. The stud 360 is adjustable by turning a nut 365 which allows inwardly and outwardly motion of the stud 360 within the bore for applying a preselected tension to the nozzle 120.

To use the holding device 170, the existing header 80 is, first, removed by methods well known in the art. One such method is by using the induction heating tool 130 for heating the connection 100 of the header cap 80 to the water header 90. This heating melts the connection 100 formed by the two pieces and allows them to be pulled away from each other. After this removal, a new header cap 80 must obviously be installed.

To install the header cap 80, the water header 90 is allowed to cool and then its outer surface is filed by a suitable tool, such as a file or block fixture which are both well known in the art, for providing a smooth surface to which the header cap 80 may be placed. A sealing material (not shown), such as Silphos which is available from Lucas-Milhaupt Inc., is placed on the water header 90, and a new header cap 80 is placed abutting the sealing material. The cooling assemblage 230 is then placed on the winding 60 for cooling and preventing damage to the winding 60. As previously stated, the first and second members 240a and 240b are mated together, and the screws 260 are properly inserted for holding them together. The hoses 280 and 285 are then connected to the members 240a and 240b for passing the water therethrough. The induction tool 130 is placed upwardly and concentrically over the header cap 80, and then pulled downwardly over the header cap 80 to its operational position as shown in FIG. 3. It will be obvious to those skilled in the art that the induction tool 130 is not energized at this time.

The plate 310 is then structurally attached to each of the four pieces 290 of the cooling assemblage 230 by respectively screwing a threaded element 300 into a hole of each piece 290 and into its opposite mating hole in the plate 310. A washer 320 is disposed over an end of each element 300 and pulled over the shaft so that it rests against the plate 310. A spring 330 is, likewise, disposed over an end of each shaft and pulled over the shaft so the it rests against the washer 330. Usually, a pressure of ten pounds is applied by the springs 330 to the plate 310. The second washer 335 is positioned abutting the opposite end of the spring 330 for providing a mechanism for uniformly compressing the springs 330 when the tighteners 340 push against it. The tighteners 340 are, likewise, placed on the element 300 abutting the spring 330 for adjusting the compression of the springs 330. During the brazing process, it is instructive to note that the springs 330 function to apply a generally unidirectional and constant pressure when the springs 330 are compressed, even if the heat caused by the brazing causes the water header 90 and header cap 80 to expand or compress.

With the above portion of the holding device 170 in place, the operator 340 is placed through its mating hole in the plate 310 and against the solid portion 200 at a point directly over the centroid of the water header 80 for evenly distributing any pressure applied by it to the header cap 80. The stud 360 is, in a similar fashion, placed though its mating hole in the plate 310 so that its end portion abuts the nozzle 120. The above described configuration holds the header cap 80 and winding 60 in a fixed, stationary positional relationship with each other so that the uniform and unidirectional force applied by the springs 330 to the plate 310 is transmitted to the header cap 80 primarily via the operator 340. The stud 360 assists in maintaining the constant and unidirectional force being transmitted to the header cap 80. Such an arrangement prevents the pressure and direction applied to the header cap 80 from changing during the brazing process.

The induction tool 130 is manually held over the header cap 80 and the winding 60 so that the heating surface is adjacent the connection 100 of the water header 90 to the header cap 80. The induction tool 130 is energized which causes the header cap 80 and water header 90 to melt into a solid, continuous connection. This process is repeated on each header cap 80 that needs replacing. After installing the header cap 80, the strands 110 are reattached to the mated pair of header caps 80 by methods well known in the art for providing the continuous electrical connection of the stator winding 60.

It is thought that the present invention and many of its attendant advantages will be understood from the foregoing description and it will b apparent that various changes may be made in the form, construction and arrangement without departing from the spirit and scope of the invention or sacrificing all of its material advantages, the form hereinabove described being merely a preferred or exemplary embodiment thereof.

What is claimed is:

1. A method for installing a header cap on a water header both positioned on a stator coil, comprising the steps of:

(a) creating a generally smooth surface on the water header for providing a mating surface on the water header;

(b) interposing a sealing means between the header cap and the mating surface of the water header for providing a material used to provide a sealed boundary between the cap and mating surface;

(c) placing the header cap and the mating surface of the water header both in abutting relationship with the sealing means for forming a layered, contiguous connection;

(d) attaching a pressure device in operative association with the header cap for operatively applying a pressure to the header cap;

(e) compressing a spring received by the pressure device for applying a constant and unidirectional pressure to the pressure device which, in turn, transmits the constant and unidirectional pressure to the header cap; and (f) heating the connection for brazing the header cap and water header together and for forming a seal.

2. The method as in claim 1, wherein said installing step includes adjusting the spring for adjusting the generally constant and unidirectional clamping force.

3. The method as in claim 2 further comprising clamping a cooling block adjacent the connection for preventing damage to the stator coil.

4. The method as in claim 3, wherein said clamping step includes pumping water through the block for providing cooling of the block.

* * * * *